2,721,203

CHLORAL NICOTINAMIDE AND METHOD FOR PREPARING THE SAME

Arthur E. Meyer, Flushing, N. Y., assignor to Fellows Medical Mfg. Co., Inc., New York, N. Y., a corporation of New York No Drawing. Application July 13, 1953, Serial No. 367,774

3 Claims. (Cl. 260—295.5)

The present invention relates to a novel chemical compound and, more particularly, to the novel chemical compound, chloral nicotinamide.

It is an object of the present invention to provide a novel derivative of chloral which has unexpectedly superior anti-convulsant properties as compared with those of chloral hydrate and certain other chloral derivatives and which is not hygroscopic, unpleasant tasting or likely to produce irritation to the mucous membranes.

Other objects of the invention will be apparent to those skilled in the art from the specification which follows.

Chloral derivatives, and particularly chloral hydrate, have been known for many years as hypnotics. Chloral hydrate, which is the best known of these hypnotics, has lost much of its popularity in therapy as an hypnotic because of certain undesirable physico-chemical qualities which it possesses. It is very hygroscopic, volatile and has an unpleasant taste and odor. In fact, one authority warned that it should not be administered in the form of tablets or pills since these concentrated forms might materially damage the mucous membranes of the stomach. This condition results from the formation of a concentrated aqueous solution in the stomach. Moreover, such tablets or pills are unstable because of the volatility and hygroscopicity of the chloral hydrate.

I have now discovered a novel derivative of chloral, namely, chloral nicotinamide, which in addition to being free from the undesirable physico-chemical properties of chloral hydrate, has been found to be unexpectedly superior in its anti-convulsant efficacy when compared to chloral hydrate and certain other chloral derivatives. Inasmuch as this compound contains a nicotinamide moiety, which is well known for its anti-pellagra property, the compound also imparts some vitamin-like therapy to the patient.

Chloral nicotinamide, which may be described otherwise as chloral niacinamide, or from the purely chemical standpoint may be named N-(2,2,2 - trichloro - 1 - hydroxyethyl)nicotinamide, is an amide derivative of chloral. It is produced by the condensation of chloral and nicotinamide. It is believed to have the following chemical structure:

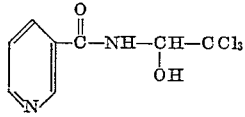

The superior anti-convulsant properties of chloral nicotinamide may be readily seen when compared with those of chloral hydrate and other chloral-acidamide compounds. The compound of the present invention has been compared with these chloral derivatives in a test for anti-convulsant properties which has become somewhat standard in this art. This test is basically a determination of the protection provided to mice against a 100% convulsion-producing dose of Metrazol. Metrazol is well known for its convulsant property and is chemically known as pentamethylenetetrazol. Metrazol produces in unprotected mice spasticity and convulsions upon injection of 85 mgs. of Metrazol in a 2% aqueous solution per kilogram of body weight. Convulsions or spasticity usually result in a few minutes and often results in death to the mice. The protection against convulsions obtained from the chloral derivatives is measured by first treating the mice with a dose of chloral derivative which has a chloral content equivalent to 100 mgs. of chloral hydrate per kilogram of body weight. The chloral derivative is administered orally as a 2% solution in propylene glycol. The above dose of Metrazol is then injected into the animal approximately 45 to 60 minutes (using the same time interval in each test) after the mouse has been orally medicated with the substance to be tested. The degree of protection afforded by the chloral derivative is measured by the percentage of animals tested which develop convulsions. In the table below are results obtained with this procedure in mice, using the chloral nicotinamide of the present invention as compared with four other chloral derivatives and as compared with no medication:

| Treatment | Total No. of Animals | No. of Animals Developing Convulsions | Percent |
|---|---|---|---|
| No treatment | 76 | 76 | 100 |
| Chloral hydrate | 28 | 17 | 61 |
| Chloral urethane | 15 | 6 | 40 |
| Chloral formamide | 22 | 14 | 64 |
| Chloral acetamide | 22 | 16 | 73 |
| Chloral nicotinamide | 66 | 13 | 19 |

In the above tests animals which had not been protected against convulsions with a chloral derivative showed a rate of fatality of 77% when subjected to the standard dose of Metrazol. While none of those animals protected against convulsions by a chloral derivative showed any fatalities, those animals protected with chloral nicotinamide showed a convulsion rate of only 19% as compared with 40% for the next lowest convulsion rate which was obtained with chloral urethane. Chloral hydrate produced a convulsion rate of 61%. It should also be noted that those animals protected with chloral urethane in the doses mentioned produced considerable untoward reactions, manifested by lack of co-ordination of the movements of the legs.

The chloral nicotinamide of the present invention may be produced in substantially theoretically quantitative yields without any unusual processing precautions or complicated and expensive equipment. The compound may be produced by reacting chloral with an equivalent amount of nicotinamide, preferably by heating the two starting materials under reflux conditions. The reaction may take place in the presence of an inert organic solvent, although this is not essential for satisfactory results.

The invention may be illustrated by the following examples.

Example 1

About 14.7 grams of redistilled chloral and 12.5 grams of nicotinamide were mixed and heated under reflux conditions at about 130–140° C. for about one hour. The reaction mixture became more liquid at first and then solidified. The reaction product, chloral nicotinamide, was extracted with the following sequence of solvents: chloroform, benzene and ethyl alcohol. The application of heat was necessary to obtain maximum extraction with these solvents. When the chloroform extract was cooled, the reaction product crystallized, producing a white crystalline material having a melting point of 163–164° C. The benzene extract gave several fractions of crystals having various melting points. The ethyl alcohol extract gave abundant white crystals, upon cooling, which had a melting point of 163–164° C. All fractions obtained which had a melting point other than 163–164° C. were obtained in small yields.

*Example 2*

About 12.5 grams of nicotinamide was heated to reflux temperature in 200 cc. of benzene which resulted in partial solution of the nicotinamide. About 15 grams of chloral dissolved in 50 cc. of benzene were then added. The reaction mixture soon became clear upon further refluxing, and subsequently heavy crystals of chloral nicotinamide formed on the wall of the reaction flask. Refluxing was continued for from 4½ to 5 hours. After cooling the reaction mixture, the crystals were collected by filtration, after which they were washed with cold benzene and dried. The yield was substantially equal to the theoretical. The crystals of chloral nicotinamide had a melting point of 164.5–165.5° C. The reaction product was soluble in most organic solvents and to the extent of about 0.3% in water. Chemical analysis of the chloral nicotinamide showed that it contained 38.97% chlorine and 10.22% nitrogen as compared to a calculated percentage of 39.49% chlorine and 10.39% nitrogen. The compound gave a positive test for chloral when subjected to the Fujiwara reaction as indicated by the production of a red color on heating with pyridine in a concentrated sodium hydroxide solution.

The use of a solvent, such as benzene indicated above, or ethylene trichloride, gives higher yields and a somewhat more pure reaction product. However, it is not necessary to use the solvent to effect condensation of the chloral with the nicotinamide.

Chloral nicotinamide may be administered to the patient in a number of ways, such as orally in solutions of propylene glycol or in tablets or pills.

The terms and expressions which I have employed are used as terms of description and not of limitation, and I have no intention, in the use of such terms and expressions, of excluding any equivalents of the features shown and described or portions thereof, but I recognize that various modifications are possible within the scope of the invention claimed.

What is claimed is:

1. The process for preparing chloral nicotinamide which comprises heating chloral with nicotinamide.

2. The novel process for preparing chloral nicotinamide which comprises refluxing chloral and nicotinamide in an inert organic solvent.

3. Chloral nicotinamide having the following structural formula:

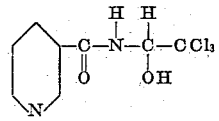

References Cited in the file of this patent

Meldrun et al.: Chem. Abst., vol. 29, pp. 136–37 (1935).
Meldrun et al.: Chem. Abst., vol. 30, p. 5940 (1936).